United States Patent
Razeto et al.

(10) Patent No.: US 9,547,894 B2
(45) Date of Patent: Jan. 17, 2017

(54) APPARATUS FOR, AND METHOD OF, PROCESSING VOLUMETRIC MEDICAL IMAGE DATA

(71) Applicant: Toshiba Medical Systems Corporation, Otawara-shi (JP)

(72) Inventors: Marco Razeto, Edinburgh (GB); Akinola Akinyemi, Edinburgh (GB); Muhammad Haris Bhatti, Edinburgh (GB); Jill Barnaby, Edinburgh (GB); Sebastian Meller, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 111 days.

(21) Appl. No.: 14/048,170

(22) Filed: Oct. 8, 2013

(65) Prior Publication Data
US 2015/0097833 A1   Apr. 9, 2015

(51) Int. Cl.
*G06T 7/00* (2006.01)
*G06T 15/08* (2011.01)
*G09G 5/377* (2006.01)

(52) U.S. Cl.
CPC ........... *G06T 7/0012* (2013.01); *G06T 7/0024* (2013.01); *G06T 15/08* (2013.01); *G09G 5/377* (2013.01);
(Continued)

(58) Field of Classification Search
USPC ................................ 345/419, 420, 619, 421
See application file for complete search history.

(56) References Cited

U.S. PATENT DOCUMENTS

| | | | |
|---|---|---|---|
| 4,769,605 A | | 9/1988 | Fox |
| 5,647,360 A | * | 7/1997 | Bani-Hashemi et al. .... 600/425 |

(Continued)

FOREIGN PATENT DOCUMENTS

| | | |
|---|---|---|
| JP | 7-21351 | 1/1995 |
| JP | 11-318883 | 11/1999 |
| JP | 2009-225979 | 10/2009 |

OTHER PUBLICATIONS

Marco Razeto, et al., "Accurate Registration of Coronary Arteries for Volumetric CT Digital Subtraction Angiography", Proc. of SPIE, vol. 8768, International Conference on Graphic and Image Processing (ICGIP 2012), 876834, Mar. 2013, 6 pages.

(Continued)

*Primary Examiner* — Kimbinh T Nguyen
(74) *Attorney, Agent, or Firm* — Oblon, McClelland, Maier & Neustadt, L.L.P.

(57) ABSTRACT

Apparatus for performing an imaging procedure comprising processing volumetric image data comprising an image processing unit configured to obtain first image data representative of a region including at least one vessel and at least one associated feature, and second image data representative of at least part of the region, an image refinement unit configured to process the first image data and the second image data to produce a combined image representative of the at least one vessel, wherein the associated feature is removed or reduced in intensity in the combined image, and a rendering unit configured to render the combined image as a simulated view that simulates a view obtainable from an alternative imaging procedure.

16 Claims, 6 Drawing Sheets
(4 of 6 Drawing Sheet(s) Filed in Color)

(52) U.S. Cl.
CPC ........... *G06T 2207/10081* (2013.01); *G06T 2207/20016* (2013.01); *G06T 2207/20224* (2013.01); *G06T 2207/30048* (2013.01); *G06T 2207/30101* (2013.01); *G09G 2320/066* (2013.01); *G09G 2380/08* (2013.01)

(56) References Cited

U.S. PATENT DOCUMENTS

| | | | |
|---|---|---|---|
| 7,117,026 B2* | 10/2006 | Shao et al. | 600/411 |
| 7,409,078 B2* | 8/2008 | Pescatore et al. | 382/130 |
| 7,742,629 B2* | 6/2010 | Zarkh | G06T 7/0067 345/419 |
| 8,155,416 B2* | 4/2012 | Nields et al. | 382/131 |
| 8,649,843 B2* | 2/2014 | Arnold et al. | 600/407 |
| 2003/0208116 A1* | 11/2003 | Liang et al. | 600/407 |
| 2006/0074285 A1* | 4/2006 | Zarkh et al. | 600/407 |
| 2008/0150942 A1* | 6/2008 | Mitchell et al. | 345/424 |
| 2013/0182925 A1 | 7/2013 | Razeto et al. | |

OTHER PUBLICATIONS

William R. Crum, et al., "Information Theoretic Similarity Measures in Non-Rigid Registration", Proceeding of IPMI 2003, pp. 378-387 (10 pages).
U.S. Appl. No. 14/519,564, filed Oct. 21, 2014, Matthews, et al.

\* cited by examiner

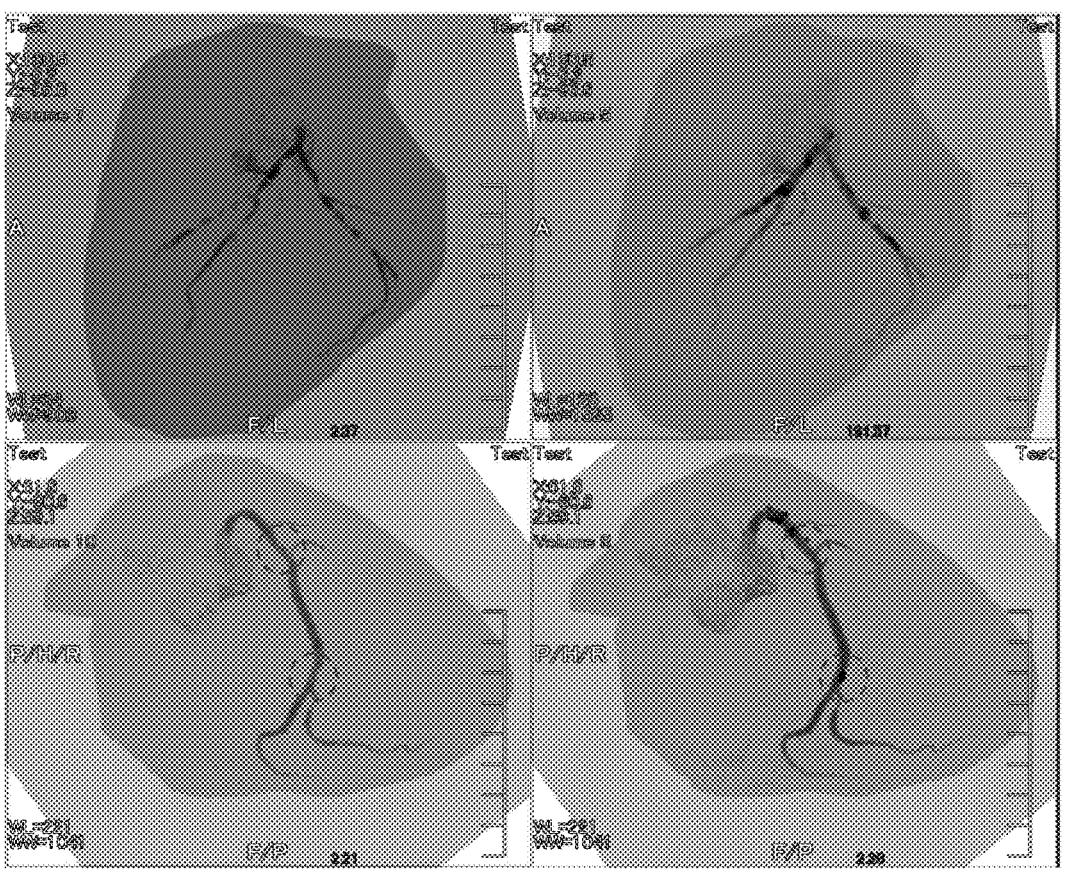

APPARATUS FOR, AND METHOD OF, PROCESSING VOLUMETRIC MEDICAL IMAGE DATA

FIELD

The present invention relates to an apparatus for, and method of, processing volumetric image data, for example volumetric image data representative of a region including at least one blood vessel and at least one calcification feature.

BACKGROUND

Coronary artery stenosis is a good indicator of coronary artery disease, and various imaging and diagnostic techniques have been developed to enable the identification and visualisation of regions that include stenoses.

Catheter coronary angiography has traditionally been considered to be the most accurate imaging technique for assessing coronary artery stenosis. However, catheter coronary angiography is an invasive process, requiring localisation of the catheter to each coronary ostium, which is uncomfortable for the patient and can pose some danger. Furthermore, the technique uses X-Ray fluoroscopy, which involves subjecting the patient to a high dose of radiation. FIG. 1 shows a 2D image obtained using catheter coronary angiography.

Calcium scoring and contrast-enhanced CT angiography (CCTA) scans may still be carried out, in addition to catheter coronary angiography procedures. However, cardiologists are used to viewing 2D images obtained using angiography, and can struggle to assess CTA scans from 2D CTA slice data alone. It is known to present 2D images obtained from CCTA scans but such images, in contrast to catheter coronary angiography images, usually include significant calcification features, when such features are present in the patient. The presence of such calcification features can make the assessment of stenosis or other conditions difficult or impossible. FIG. 2 is a 2D image obtained from a CCTA scan in which significant calcification features are visible. Similar issues can arise with stents or other features associated with a vessel, for example surgical clips, pacemakers or other metallic artefacts.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are now described, by way of non-limiting example, and are illustrated in the following figures, in which:

FIGS. 7a and 7c are simulated angiogram views obtained by the embodiment of FIG. 3 from CCTA and calcium scoring data; and FIGS. 7b and 7d are views obtained from the same sets of CCTA data as for FIGS. 7a and 7c, but in which there is no removal of the calcification regions by registration and subtraction of the calcium scoring data.

DETAILED DESCRIPTION

According to an embodiment there is provided apparatus for performing an imaging procedure comprising processing volumetric image data, the apparatus comprising an image processing unit configured to obtain first image data representative of a region including at least one vessel and at least one calcification feature, and second image data representative of at least part of the region, an image refinement unit configured to process the first image data and the second image data to produce a combined image representative of the at least one vessel, wherein the associated feature is removed or reduced in intensity in the combined image, and a rendering unit configured to render the combined image as a simulated view that simulates a view obtainable from an alternative imaging procedure.

According to an embodiment, there is also provided a method of processing volumetric image data comprising obtaining first image data representative of a region including at least one vessel and at least one associated feature, and second image data representative of at least part of the region, processing the first image data and the second image data to produce a combined image representative of the at least one vessel, wherein the associated feature is removed or reduced in intensity in the combined image, and rendering the combined image as a simulated view that simulates a view obtainable from an alternative imaging procedure.

The simulated view may comprise a simulated angiogram view, for example a simulated catheter coronary angiogram view.

Figure 3:
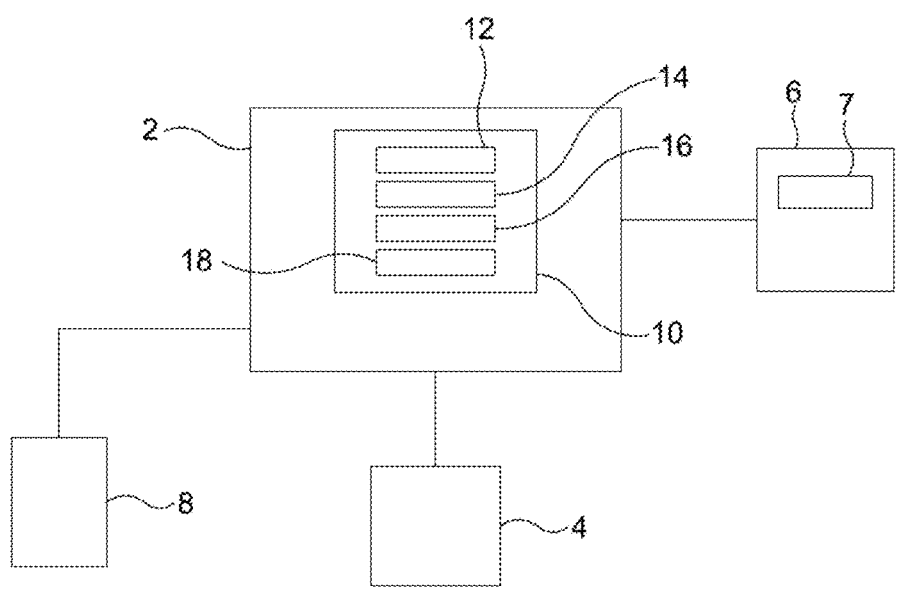
FIG. 3 is a schematic diagram of an image data processing system according to an embodiment.

An image processing apparatus according to an embodiment is illustrated schematically in FIG. 3 and is configured to implement the method described in the preceding paragraph. The apparatus comprises a processing apparatus 2, in this case a personal computer (PC) or workstation that is connected to a display device 4, a CT scanner 6 and a user input device or devices 8, in this case a computer keyboard and mouse.

Any suitable type of CT scanner may be used that is able to perform three dimensional CT measurements on a patient or other subject, for example one of the Aquilion® series of scanners produced by Toshiba Medical Systems Corporation. Although the embodiment of FIG. 3 is described in relation to CT scan data, any other suitable type of scanner producing any suitable type of image data may be used in alternative embodiments, for example MR data of suitable form and if subject to suitable pre-processing.

Figure 1:
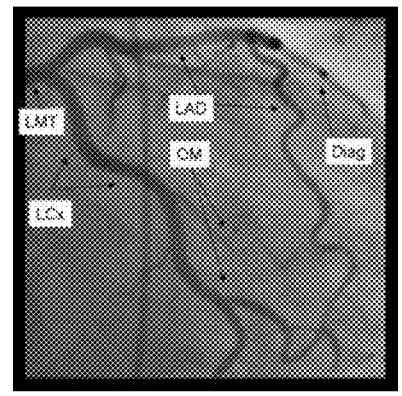
FIG. 1 is a 2D image obtained using known catheter coronary angiography techniques.
Figure 2:
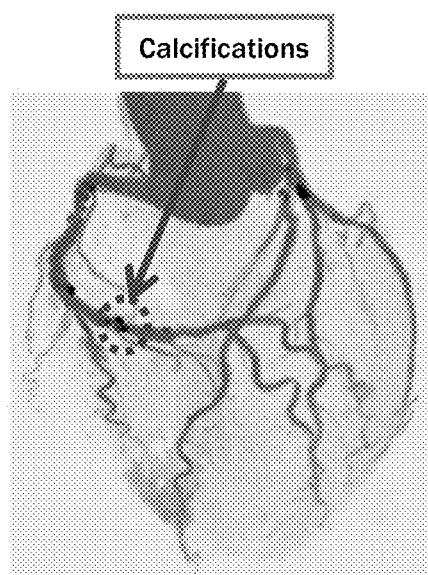
FIG. 2 is a 2D image obtained from a CCTA scan using known techniques, in which significant calcification features are visible.

The processing apparatus 2 provides a processing resource for automatically or semi-automatically processing image data, and comprises a central processing unit (CPU) 10 that is operable to load and execute a variety of units or other components that are configured to perform a method as described in detail below with reference to FIG. 2.

The units include a registration unit 12 for performing rigid and non-rigid registration procedures, an image processing unit 14, an image refinement unit 16 for refining registered images, and a rendering unit 18 for processing image data to produce rendered images and for providing the rendered images to the display device 4 for display to a user.

A rigid registration in this context may be considered to be a registration in which the co-ordinates of data points in one data set are subject to rotation, translation and/or scaling in order to register the data set to another data set. An affine registration in this context may be considered to be a registration in which the coordinates of data points in one dataset are subject to rotation, translation, scaling and/or shearing in order to register the dataset to another dataset. Thus, a rigid registration may be considered to be a particular type of affine registration.

The processing apparatus 2 also includes a hard drive and other components of a PC including RAM, ROM, a data bus, an operating system including various device drivers, and hardware devices including a graphics card. Such components are not shown in FIG. 3 for clarity. Any suitable CPU and other components of the processing apparatus may be used in different embodiments.

In the embodiment of FIG. 3 image data sets 7 are received by the processing apparatus 2 from the CT scanner 6 following performance of scans by the scanner 6, and are stored and processed by the processing apparatus. Although the scanner 6 shown in the embodiment of FIG. 3 is a CT scanner, any other suitable type of scanner can be used to obtain the image data sets in alternative embodiments.

In a variant of the embodiment of FIG. 3, the processing apparatus 2 receives image datasets from a remote data store (not shown) rather than from the scanner 6. The remote data store stores a large number of different data sets obtained from many different scanners over a period of time together with associated patient data. The data store may be a server that stores a large quantity of patient data, and may form part of a Picture Archiving and Communication System (PACS), for example the Toshiba Rapideye® system.

Figure 4:
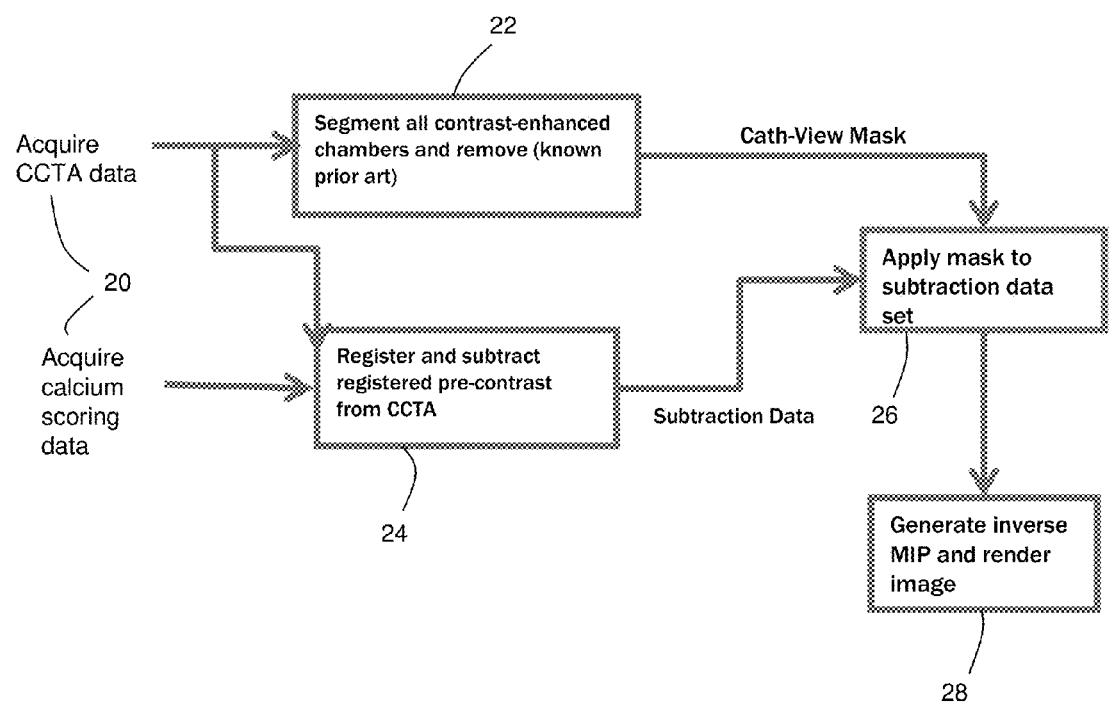
FIG. 4 is a flow chart illustrating in overview a method of producing an angiogram view from first and second image data sets, in this case calcium scoring and CCTA data sets.

The system of FIG. 3 is configured to perform a process having a sequence of stages as illustrated in overview in the flow chart of FIG. 4.

At the first stage 20, the image processing unit 14 acquires first and second image datasets either from the scanner 6 or the data store. In this example, the first image data set is a calcium scoring data set, which in this case is a volumetric CT image dataset of the heart region acquired when there is substantially no contrast agent present in the heart region. The second image dataset in this example is a volumetric CT image dataset of the heart region of a subject acquired after contrast agent has been injected and has reached and is present in those parts of the heart region that are of most interest for the scan.

Calcified regions usually show up well in calcium scoring data sets, for example non-contrast enhanced CT scan data sets acquired for calcium scoring, and due to the absence of contrast agent are usually the brightest regions in the data set. It is thus known to use calcium scoring data sets to determine the amount and location of calcified regions. However, in the embodiment of FIG. 3 the calcium scoring data set is used in a registration, masking and subtraction procedure to remove or reduce in intensity calcified regions in the resulting image and, if so desired, to present a simulated catheter CT angiogram view to a user, as is described in more detail below.

At the next stage 22, the image processing unit 14 performs a segmentation procedure to segment all contrast-enhanced chambers of the heart and remove them from the second image data set. The segmentation is performed because, in this example, it is the vessel structures rather than the heart chambers that are of primary interest. Any suitable segmentation procedure can be used to segment and remove the data representing the heart chambers, for example an atlas-based segmentation procedure or a segmentation procedure as described in Murphy et al, International Journal of Computer Assisted Radiology and Surgery, Vol. 7, Issue 6, pp 829-836, November 2012.

In the present example, the segmentation identifies the heart and thirteen associated structures (the left ventricle epicardium, the right ventricle epicardium, the left ventricle endocardium, the right ventricle endocardium, the left atrium with left auricle, the right atrium with right ventricle, the superior vena cava, the left inferior pulmonary vein, the left superior pulmonary vein, the right inferior pulmonary vein, the right superior pulmonary vein, the pulmonary trunk and the aortic root) but any other suitable segmentation can be used.

A mask is then formed representing the locations of the remaining regions, in this case including the aorta and the coronary arteries. The mask may be formed using any suitable procedure, for example by applying a thresholding to the data. The mask will usually represent contrast-enhanced vessels, associated calcification features, and any other regions or artefacts above the threshold. The thresholding procedure may, in the simplest case, comprise comparison of the data to a single threshold or, in alternative modes of operation, may involve the use of various morphological operations, for example dilation and/or close operations, the application or one or more size-dependent filters, as well as the comparison to one or more thresholds.

The time at which the first image dataset was acquired by the scanner, and the time at which the second image dataset was acquired by the scanner are usually different. There is inevitably some movement of the patient between the first and second image data acquisitions, even if the datasets are obtained using the same scanner, and even if the patient remains within the scanner between the data acquisitions. There is also inevitably some movement of blood vessels and other anatomical features within the heart region between the first and second image data acquisitions, for example due to natural physiological processes.

It is desired to subtract the first image data set from the second image data set in order to view clearly the blood vessels, which are distinguished in the second image dataset by the presence of contrast agent. However, in the present case it is necessary firstly to perform a registration procedure to ensure that the first and second image datasets are correctly aligned before performing a subtraction procedure.

Any suitable registration and subtraction procedure may be used. However, in the embodiment of FIG. 3 multiple registrations are used, with a second registration being used to refine a first registration. Such a registration procedure is described in more detail with reference to FIG. 5 and uses both rigid and non-rigid registrations. A suitable registration procedure is also described, for example, in M. Razeto et al, "Accurate Registration of Coronary Arteries for Volumetric CT Digital Subtraction Angiography", Proc. SPIE, 8768, International Conference on Graphic and Image Processing (ICGIP 2012), 876834, March 2013.

At the first stage 32 of the registration procedure, a non-rigid registration procedure is applied to register the second data set to the first data set (or vice versa) by the registration unit 12. The non-rigid registration procedure is a global procedure that performs the registration with respect to all of the data in the first and second image datasets.

A pre-processing stage may be used to eliminate extraneous data from the first and second image data sets before performing the global non-rigid registration procedure. The eliminated extraneous data can include, for example, data representative of blank space, and in some cases may include data representative of padding or of a patient table or other artefact. The pre-processing stage may be omitted if desired.

Figure 5:
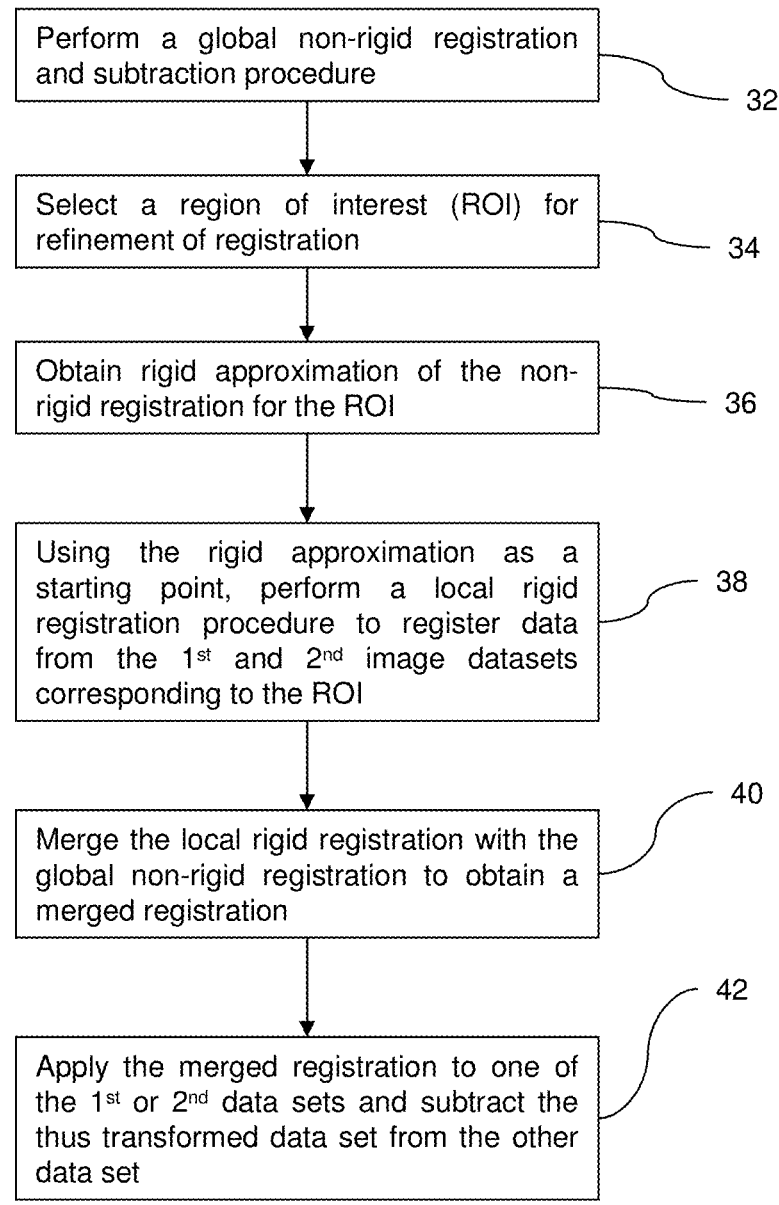
FIG. 5 is a flow chart illustrating in overview a procedure for registering the first and second image data sets.

Any suitable non-rigid registration procedure can be used at stage 32. In the embodiment of FIG. 5, the global non-rigid registration procedure uses Mutual Information as a similarity measure, and a non-rigid warpfield is computed using the Crum-Hill-Hawkes scheme (William R. Crum, Derek L. G. Hill, David J. Hawkes. Information Theoretic Similarity Measures in Non-rigid Registration, Proceedings of IPMI '2003, pp. 378-387). In this particular application a multiscale approach with subsampling factors 4 and 2 is used. This means that a global non-rigid registration at full scale, which has proven to be demanding from a runtime and memory point of view, is not performed in this mode of operation.

Each of the first and second image datasets comprise a set of voxels, each voxel comprising an intensity value and each voxel having a set of co-ordinates (for example, x, y, z co-ordinates) representing the spatial position for which the intensity value for that voxel was measured by the scanner 6 in a chosen co-ordinate system (for example, a cartesian co-ordinate system). The non-rigid registration generates a warpfield that comprises, for each voxel, an offset of the spatial co-ordinates for that voxel. By applying the warpfield obtained from the non-rigid registration procedure to the second image dataset in order to obtain a transformed second image dataset, the spatial co-ordinates of each voxel of the original second image dataset are shifted according to the warpfield such that a voxel in the second image dataset after transformation represents substantially the same position in the subject's body (substantially the same anatomical location) as a voxel in the first image data set having the same spatial co-ordinates. In most practical circumstances it is necessary due to time or processing constraints to use a multi-scale registration procedure, in which reduced versions of the data sets are registered with each other. Such multi-scale registration procedures require interpolation of, and selection from, data points of the full data sets, and such interpolation and selection processes inevitably lead to some errors in the registration. The errors may be relatively small but can still have a significant effect on the registration and viewing of small, high contrast regions such as calcifications and stents.

Following the registration and transformation procedure, the first image data set is subtracted from the registered second image data set and the resulting subtracted image data set is displayed to the user on the display device 4. If the registration is perfect then the subtracted data set should show only the blood vessels, heart chambers or other anatomical features, in which the contrast agent is present. In practice, a global registration will never be perfect, due to registration errors inherent in a multi-scale registration procedure and as the registration cannot compensate precisely for all shifts in position and orientation of anatomical features between the acquisition of the first image dataset and the second image dataset.

Figure 6:
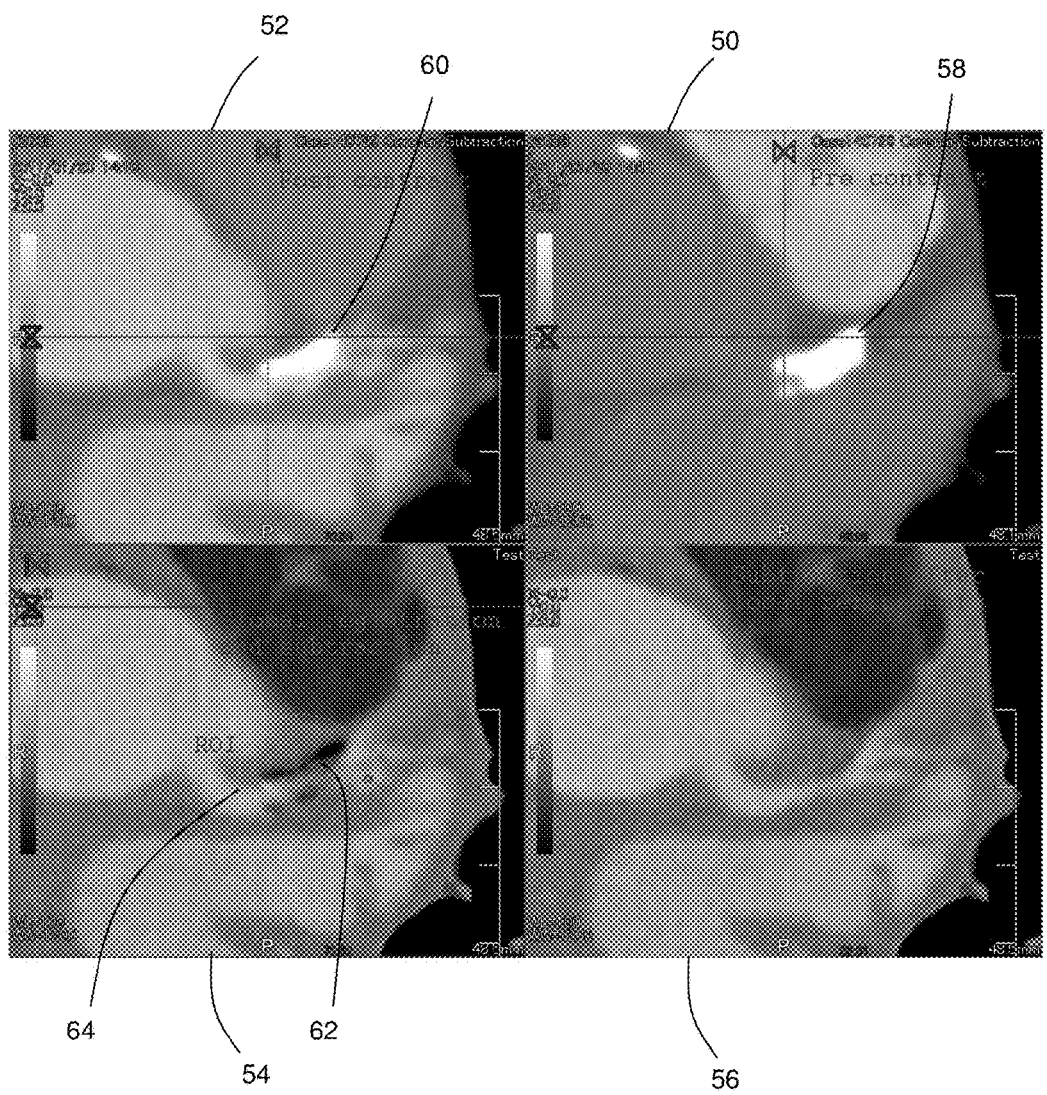
FIG. 6 shows examples of precontrast and post contrast images, an image produced following global registration and subtraction processes; and an image produced following local refinement.

FIG. 6 shows, by way of illustrative example, a first, pre-contrast image dataset displayed as an image 50 on the display device 4 together with an image 52 representing the second, post-contrast image dataset prior to performance of the global non-rigid registration procedure. An image 54 representative of the subtracted data set obtained by subtraction of the first image dataset from the transformed second image dataset following the global non-rigid registration procedure is also shown.

It can be seen in the images 50 and 52 that a region of calcification is present in a blood vessel. The region of calcification shows up sharply in the images 50, 52 as white areas 58, 60.

It is a feature of areas of calcification that they are rigid and generally do not stretch or shear. In contrast, surrounding areas of tissue and blood vessels do stretch and shear significantly as a function of time. Global non-rigid registration algorithms are able to produce registrations that compensate effectively for such stretch and shear processes. However, as already noted some errors are inherent in practice in a multi-scale registration process, and such errors can become significant in know systems when high contrast features such as calcification or stents are present adjacent to areas of interest such as blood vessels. Furthermore, in practice, significant errors can arise when using known techniques due to the size of displacements of the first and second image data sets in relation to the size and nature of the features that are to be studied, such as blood vessels. There are inevitably some errors in registration using known techniques due to the displacements between data sets, and such errors become particularly significant when the features, such as blood vessels, that are to be studied in the subtracted data set are relatively small.

It can be seen in the subtracted image 54 that the presence of the calcification produces significant artifacts in the subtracted image 54. In the image 54, the artifacts appear as dark areas 62. An additional issue is that areas of calcification are usually found on the surface of blood vessels and thus are adjacent to those features (the blood vessels) that may be the intended subject of the subtracted image. The presence of artifacts in the subtracted image can obscure or interfere significantly with the viewing or analysis of features of interest in the subtracted image. It is a feature of the embodiment of FIG. 3 that a further, local registration procedure is performed in order to remove the artifacts, as will now be described.

At the next stage 34 of the registration process a region of interest (ROI) is selected, under control of the image selection unit 18, for performance of the further, local registration procedure. In the embodiment of FIG. 3, the user can select the centre of the region of interest by clicking a mouse pointer on a point in the image. By then dragging the mouse, a circular boundary can be enlarged around the selected point to define the region of interest. Such a circular boundary 64 is shown in the subtracted image 54 of FIG. 6. A sphere having the radius of the circular boundary and centred at the user-selected point is defined by the image selection unit 18 as being the ROI.

In alternative embodiments, any suitable method can be used for selection of the region of interest by a user. For example any suitable sequence of mouse operations or other user input device operations can be used to select the region of interest. The region of interest is not limited to being spherical, and any suitable shape can be used. For instance the region can be selected to be cubic or rectangular, or a plurality of points selected by a user can be joined to form the outline of the region. The subtracted image displayed to the user can be three dimensional rather than two dimensional in some embodiments, and the user can select the region from the three dimensional image. In other embodiments, the user can select the region from one or both of the acquired images rather than from the registered, subtracted image.

In further alternative embodiments, regions of interest can be selected automatically, for example based on the automatic detection of the presence of regions of high contrast above a predetermined threshold.

In the embodiment of FIG. 3, the user-selected ROI is the region over which a further, refined registration determined in subsequent stages 36, 38 by the image refinement unit 16 is applied fully. A buffer region surrounding the ROI (for example a hollow spherical shell beginning at the boundary of the ROI and extending by a predetermined distance in a radial direction) may also be defined. The further, refined registration is applied only partially over the buffer region as part of a merging procedure that merges the refined registration for the ROI with the global non-rigid registration. That merging is described in more detail below in connection with stage 40 of the procedure.

The further registration procedure is performed at stage 38 using only the data corresponding to the ROI in order to refine the registration obtained for the ROI, and improve the quality of the registration.

It is a feature of the embodiment of FIG. 3 that, before performing the further registration procedure, a rigid approximation of the non-rigid warp field obtained for the ROI using the initial, global registration procedure is determined at stage 36. The rigid approximation matches the non-rigid warp field as closely as possible. The rigid approximation is then used as the starting point for the further registration procedure at stage 38.

The reason behind the determination of the rigid approximation to the non-rigid warpfield at stage 36 is that the movement between pre- and post-contrast scans (the first and second image datasets in this case) can be substantial (at the scale, for example, of coronary arteries). It has been found in some cases that the overlap of the relevant structures between the unregistered pre- and post-contrast data (the first and second image datasets) can be too small for a local rigid registration procedure in respect of the ROI to succeed fully if the local rigid registration algorithm does not have a starting point that is reasonably close to the likely final local rigid registration. Such a starting point is provided by the determination of the rigid approximation of the non-rigid warp field. In alternative embodiments, an affine approximation of the warp field can be determined and used as the starting point for a local registration algorithm.

In order to properly initialize the local rigid registration the warpfield inside the ROI is approximated by a rigid transformation at stage 36, using the following method:
1. Sample point coordinates of voxels inside the ROI (for example, 20000 points)
2. For each point in the sample population, apply the warpfield and record the warped coordinates.
3. Using the resulting corresponding co-ordinate pairs (original voxel co-ordinates and corresponding warped coordinates), apply a multi-linear least square regression procedure to determine an affine transformation that maps the original voxel co-ordinates to the corresponding warped co-ordinates. This process returns an affine transformation matrix, which may still contain scaling and shearing components.

In order to remove the scaling and shearing components, the procedure at stage 36 continues as follows:
4. Using polar decomposition, extract the rotational part of the affine transformation matrix using known techniques. An example of a suitable polar decomposition technique is described in K. Shoemake and T. Duff, Matrix Animation and Polar Decomposition, Proceedings of Graphical Interface 1992, pp 258-264, 1992.
5. Apply the affine transformation found in step 3 to the centre point of the ROI (also referred to as the centre of gravity of the ROI).
6. Determine the displacement between the warped and original centre of gravity, and take that displacement as representing the translational part of the rigid transformation.
7. Combine the results of steps 4, 5, and 6 to obtain the rigid approximation of the warpfield for the ROI. The rigid approximation comprises the rotational and translational components determined in steps 4 and 6. In this particular application scaling is fixed to one by design, so no extraction of the scaling is necessary. It is however possible also to extract the scaling component if desired.

At the end of stage 36 a local rigid approximation of the non-rigid warpfield is obtained for the ROI. The local rigid approximation can only be as good as the original non-rigid registration, meaning that a poor global warpfield potentially will produce a poor local rigid approximation. In such a case, it is likely that the local rigid registration will fail. However, in practice it has been found that such situations do not occur and the global warpfields can generally be used to produce a satisfactory local rigid registration approximation.

At the next stage 38, the local rigid registration procedure is performed to register the data from the first and second datasets (the pre- and post-contrast data respectively) for the ROI. In the embodiment of FIG. 3, the local rigid registration algorithm is based generally on the known principles of Powell-style optimization of the Mutual Information similarity measure, but any other suitable algorithm may be used.

The data from the second dataset falling within the ROI are registered to the data from the first dataset falling within the ROI. The local rigid registration procedure takes as a starting point the local rigid registration approximation obtained at stage 36, and then varies the registration using Powell-style optimization of the Mutual Information similarity measure, or any other suitable optimisation procedure, until an optimised local rigid registration is obtained.

There may be some pre-processing of the selected data prior to the performance of the local rigid registration procedure in some modes of operation. For example, extraneous data such as data corresponding to padding, patient table or other equipment and/or air can be stripped out using known techniques before the local rigid registration procedure is performed.

Another pre-processing procedure that may be performed before the local rigid registration procedure comprises a thresholding procedure. In many cases, what is referred to as "pre-contrast" data (the first data set in the foregoing description relating to FIG. 3) is in fact data obtained from a scan acquired after contrast agent has been injected into a subject but before the contrast agent reaches the aorta and the coronaries (or other features that are the intended subject of the scan). The contrast agent may nevertheless be present in, for example, the right ventricle at the time of the pre-contrast scan. This means that there may be areas of bright material in unexpected parts of the heart in the pre-contrast scan. Problems can arise as the left coronary tree runs very close to the right ventricle, potentially confusing the registration algorithm.

In a variant of the described embodiment, the issue described in the preceding paragraph is addressed by performing a further pre-registration procedure between stages 36 and 38. According to the pre-registration procedure, regions of the pre-contrast image data that have an intensity above a pre-determined threshold and a size above a pre-determined size are identified automatically by the image refinement unit 16 and disregarded for the purposes of the registration. Thus, the contrasted blood in the pre-contrast volume can be identified and discarded for the purposes of the registration. The corresponding regions of the post-contrast image data can also be disregarded for the purposes of the registration. In one mode of operation, the threshold intensity is selected to be around 200 HU (Hounsfield units), and the threshold size is set to be larger than a typical large stent or calcification (for example the threshold size may be set to be around or substantially equal to 12.5 mm$^3$). The regions selected by the thresholding procedure may be masked out.

In one mode of operation of the embodiment of FIG. 3, the rigid registration procedure at stage 38 is performed on the intensity data of the first and second image data sets. However, Mutual Information (MI) works best if computed over a relatively large amount of data. Unfortunately, many of the calcifications that the process is used to register are quite small, and consist of a limited number of voxels. This makes MI less reliable in matching structures, especially borders. Moreover, the calcifications are often partially surrounded by bright, contrasted blood, increasing the mismatch in voxel intensity.

In order to mitigate this effect, in other modes of operation of the embodiment of FIG. 3, gradient information is incorporated in the registration algorithm used at stage 38 by registering gradient magnitude data derived from the first and second image data sets instead of registering image intensity data.

The gradient magnitude as a function of position is computed by the gradient calculation unit 14 for the volume within the ROI for both pre- and post-contrast data (the first and second data sets in this case). The rigid registration process at stage 38 is then performed to register the gradient data obtained from the second data set to the gradient data obtained from the first data set.

In certain modes of operation, an image clamp is applied before calculating the gradient magnitudes, in order to focus only on structures of interest (contrasted blood and calcifications/stents). Clamping limits may be, for example, 50 HU and 600 HU, meaning that intensity values below 50 HU and above 600 HU are limited to 50 and 600 HU, respectively.

Once the clamping has been performed the gradient magnitudes are calculated and the rigid registration procedure of stage 38 is carried out. The resulting image data, after clamping and magnitude calculation is poorer in information, as much low and high intensity detail is lost, yet all the information is concentrated on the areas that it is most important to align correctly, for example the edges of the calcifications. It is important to note that usually the clamped gradient data is used only to obtain the correct registration. The registration is then applied to the intensity data of the original second image data set in order to align the first and second image data sets.

At the end of stage 38 a local rigid registration is obtained that represents a registration of the second image dataset to the first image dataset at the ROI. A global non-rigid registration was already obtained at stage 32, that represents a registration of the entire second image dataset to the entire first image dataset. At the next stage, 40, the local rigid registration is merged with the global non-rigid registration to obtain a merged registration.

The merging is performed by the image refinement unit 16 using the buffer region surrounding the ROI (for example a hollow spherical shell beginning at the boundary of the ROI and extending by a predetermined distance in a radial direction) that is defined by the image selection unit 18. The buffer region may be referred to as a feathering buffer and may be of a fixed size.

The merging can be performed using two successive processes. Firstly the local rigid transformation and the global warpfield obtained from the global non-rigid registration are blended by taking the weighted average of the two at each location (each voxel) within the buffer.

The weighting used in the weighted average calculation changes linearly with a change in distance from the ROI, resulting in only the local rigid registration being used inside the ROI, and only the global non-rigid registration being used outside the blending buffer.

For a voxel having a location within the blending buffer but close to the boundary with the ROI, the displacement of the voxel co-ordinates with respect to the co-ordinates of that voxel in the original second image data set obtained according to the merged registration will be determined primarily by the local rigid registration with a small adjustment due to the weighted global non-rigid registration. Similarly, for a voxel having a location within the blending buffer but close to the boundary furthest from the ROI, the displacement of the voxel co-ordinates with respect to the co-ordinates of that voxel in the original second image data set obtained according to the merged registration will be determined primarily by the global non-rigid registration with a small adjustment due to the local rigid registration.

Any other suitable merging processes can be used in alternative embodiments. For example, the weightings can vary in any suitable manner, and do not need to vary linearly with distance from the ROI. For example, the weightings can vary as any suitable function of distance, for instance as a quadratic or other polynomial function, a sigmoid function or a hyperbolic function of distance. The boundary between regions where weightings are applied and no weightings are applied can be selected in dependence on the difference between the global registration and the local rigid registration for those locations, for example the size and location of the buffer region boundary can be determined automatically in dependence on such differences.

At the next stage, 42, the merged registration is applied to the second image data set to obtain a registered second image data set that is registered to the first image data set.

At the end of stage 42, the first image data set, in this case the calcium scoring data is subtracted from the registered second image data set, in this case the CCTA data, to produce a set of subtraction data that excludes, or reduces the prominence of, calcifications, stents or other extraneous features.

As noted above, any other suitable registration and subtraction procedure can be used in alternative embodiments, in place of the registration and subtraction procedure described with reference to FIG. 5.

Returning to the flow chart of FIG. 4, at stage 26 the mask obtained at stage 22 is then applied to the subtraction data obtained at stage 24, thereby to exclude or flag image data representative of the contrast-enhanced heart chambers or other selected anatomical features. That enables subsequent rendering of the image data without the excluded or flagged image data to leave a residual, subtracted image that includes data representative of the blood vessels but excludes data representative of calcification features and contrast-enhanced heart chambers or other selected anatomical features. In the present example, such a residual, subtracted image would include the aorta and all of the coronary arteries.

At the next stage 28, the rendering unit 18 renders the image data to produce the rendered image for display by the display device 4. In the case of the embodiment of FIG. 3, the rendering unit performs an inverse maximum intensity projection (MIP) process as part of the rendering process. The rendering unit 18 renders the residual, subtracted image data to produce a 2D angiogram view that simulates an image that would be produced by an X-ray catheter coronary angiogram. The simulation is obtained due to the removal of the calcification features from the image and by the removal of the contrast-enhanced heart chambers or other selected anatomical features.

In real X-ray catheter coronary angiograms, heart chambers and other anatomical features, such as those identified during the masking process of segmentation and mask generation process of stage 22, may be visible but of lesser intensity than vessels such as the aorta and coronary arteries. Therefore, in alternative embodiments the rendering unit is configured not to remove the heart chambers and other selected anatomical features entirely at stage 28, but instead to vary the appearance of the heart chambers or other features so as to make the appearance of the resulting 2D simulated image closer to that typically obtained in an X-ray catheter coronary angiogram.

For example, the rendering unit may control at least one of brightness, contrast, colour or intensity of image regions corresponding to the heart chambers or other anatomical features, thereby to de-emphasise or emphasise those features and to render them with an appearance that would be expected in accordance with a typical X-ray catheter coronary angiogram. The resulting image may thus include a dimmed or faded view of the heart.

The variation of the appearance of the heart chambers and other anatomical features may be represented in the mask itself, for example by provision of a low intensity mask or a mask having variable opacity levels, or may be controlled by the rendering unit when applying the mask to the residual, subtracted image data.

By varying the appearance of the heart chambers and other anatomical features as described, familiar reference points, for example, the heart outline may be included in the simulated angiogram view output to the user. The operator, for example a radiologist or cardiologist can find the presence of such reference points useful in analysing the image.

FIG. 7a is a simulated angiogram view obtained by the embodiment of FIG. 3 from CCTA and calcium scoring data using the process described in relation to FIGS. 4 and 5. FIG. 7b is a view obtained from the same set of CCTA data as for FIG. 7a, but in which there is no removal of the calcification regions by registration and subtraction of the calcium scoring data. It can be seen in the FIG. 7b that a calcification can still be seen (circled) in a region of stenosis. The calcification been removed in the case of FIG. 7a and only the true lumen of the blood vessels is visible, narrowing at the stenosis region. Thus, the image of FIG. 7a is closer to the image that would be obtained from an X-ray catheter coronary angiogram.

Similarly, FIG. 7c is a simulated angiogram view obtained by the embodiment of FIG. 3 from CCTA and calcium scoring data using the process described in relation to FIGS. 4 and 5. FIG. 7d is a view obtained from the same set of CCTA data as for FIG. 7c, but in which there is no removal of the calcification regions by registration and subtraction of the calcium scoring data. It can be seen in the FIG. 7d that calcifications can still be seen (circled), whereas in FIG. 7c the lumen of the blood vessels is visible, narrowing at the stenosis regions.

Any suitable view angle can be used by the rendering unit 18 to render the residual, subtracted image data. For example, the rendering unit 18 can render the image data to produce a view in accordance with standard angiography angles, for example RAO 20 Caud 20, PA 0 Caud 30, LAO 50 Caud 30, or any other suitable angle. Alternatively or additionally, the rendering unit 18 may use a perspective rendering process to increase the field of view to simulate output from a flat-panel detector.

By suitable configuration of the segmentation and masking process performed at stage 22 it can be ensured that the final, displayed image includes all coronary arteries if desired. By excluding calcium features, which would otherwise show up as dark blobs and interfere with viewing of blood flow in stenosed arteries, the embodiment of FIG. 3 can ensure that the narrowing of arteries at stenosis regions can be viewed clearly. The embodiment is also able to display a view that includes even small arteries using inverse segmentation, and is able to produce an output image that resembles a conventional coronary angiography output.

The embodiment of FIG. 3 has been described in relation to the registration and subtraction of CCTA data and calcium scoring data. Any other suitable types of data can be subtracted or otherwise combined in alternative modes of operation of the embodiment, if that produces image data in which a calcification feature is removed or reduced in intensity. For example, the data may comprise any suitable types of contrast-enhanced and non-contrast image data, or any other suitable sets of image data in which calcification features can be removed or reduced in intensity by way of combining, for example subtracting, data of one set from data of another set. The data may comprise, for example, spectral CT, cone-beam CT, single energy CT or MR data. In the case of spectral CT data, the different sets of data may be sets of data obtained simultaneously at different frequencies and using a common co-ordinate system. In that and similar cases, no registration of the data sets may be required before performing subtraction or other procedure, as the data sets may already be substantially aligned with each other.

Embodiments can provide a method for simulating a calcium-free coronary angiogram from a plurality of sets of volumetric medical imaging data, which may consist of spectral CT, cone-beam CT, single energy CT and MR data, in which some or all of the input data are combined to remove structures blocking the visualisation of the lumen.

Non-contrast data may be registered to contrast-enhanced data and subtracted from it to remove calcium. Inverse segmentation may be performed on the contrast-enhanced scan to produce a mask containing arteries or other features of interest, and the mask may be applied to the subtraction data. The masked region of the subtraction data may be displayed as an inverse Maximum Intensity Projection 3D volume.

The embodiment of FIG. 3 has been described in relation to imaging of vessels near the heart, and the emphasising or de-emphasising of regions of the heart in the resulting image. In alternative embodiments or modes of operation, other suitable anatomical features may be used as reference points in the rendered image and/or their appearance may be emphasised or de-emphasised, for example in order to simulate an angiogram view. Examples of such anatomical features include, for example verterbra, rib, sternum, diaphragm, coronary artery, or secondary coronary artery.

Embodiments can be used to view any suitable vessels, for example a coronary artery an aorta, a peripheral vessel in an arm or leg, a carotid vessel, a renal artery, a splenic artery, a hepatic artery, or a blood vessel of the brain.

Although the embodiment of FIG. 3 has been described in relation to the removal or reduction in intensity of calcification features it may also be used to remove or reduce in intensity other features associated with a vessel, for example other features that may block or interfere with viewing of vessels, such as stents, or even surgical clips, pacemakers or other metallic artefacts. In this context, a feature associated with a vessel may be considered to include features that may interfere with imaging or viewing of the vessel, for example extraneous features that may not be present at or near a normal, healthy vessel.

The embodiment of FIG. 3 has been described in relation to the rendering of a combined image that simulates a view obtainable from an angiogram, for example a view obtainable from data obtained from an X-ray catheter coronary angiography procedure. In alternative embodiments or modes of operation, the rendered image may simulate any other image obtainable using any suitable alternative modality or imaging procedure. For example, an image obtainable from a suitable 2D medical measurement, for example any suitable 2D X-ray measurement, may be simulated by suitable processing of 3D image data according to an embodiment.

It will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits)), FPGAs (field programmable gate arrays) or GPUs (graphic processing units) or by a mix of hardware and software.

Whilst particular units have been described herein, in alternative embodiments, functionality of one or more of those units can be provided by a single unit, processing resource or other component, or functionality provided by a single unit can be provided by two or more units or other components in combination. Reference to a single unit encompasses multiple components, for example units, providing the functionality of that unit, whether or not such components are remote from one another, and reference to multiple units encompasses a single component, for example unit, providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. An apparatus for performing an imaging procedure including processing volumetric medical image data, the apparatus comprising:
an image processing unit configured to obtain first non-contrast-enhanced medical image data representative of a region including at least one vessel and at least one associated feature, and second contrast-enhanced medical image data representative of at least part of the region and set the region on the first non-contrast-enhanced medical image data and the second contrast-enhanced medical image data, wherein the first non-contrast-enhanced medical image data comprises one of CT data, cone-beam CT data, and MR data, and the second contrast-enhanced medical image data comprises one of CT data, cone-beam CT data, and MR data such that the first non-contrast-enhanced medical image data and the second contrast-enhanced medical image data both comprise CT data or both comprise cone-beam CT data or both comprise MR data, and wherein neither the first non-contrast-enhanced medical image data nor the second contrast-enhanced medical image data comprises data obtained by catheter coronary angiography;
an image refinement unit configured to execute a local registration between the first non-contrast-enhanced medical image data and the second contrast-enhanced medical image data based on the set region and subtract the second contrast-enhanced medical image data from the first non-contrast-enhanced medical image data to produce a combined image representative of the at least one vessel, wherein the associated feature is removed or reduced in intensity in the combined image; and
a rendering unit configured to render the combined image as a simulated catheter coronary angiogram view without using data obtained by catheter coronary angiography.

2. The apparatus according to claim 1, wherein the associated feature comprises at least one of a calcification feature or a stent.

3. The apparatus according to claim 1, wherein the image processing unit is configured to identify at least one anatomical feature and the apparatus is configured to emphasise or de-emphasise the identified at least one anatomical feature in the combined image.

4. The apparatus according to claim 3, wherein the emphasising or de-emphasising of the at least one anatomical feature comprises controlling at least one of brightness, contrast, color, and intensity to emphasise or de-emphasise the at least one anatomical feature.

5. The apparatus according to claim 3, wherein the rendering unit is configured to display the at least one anatomical feature in accordance with an expected appearance according to at least one of an X-ray fluoroscopy measurement and a catheter coronary angiogram.

6. The apparatus according to claim 3, wherein the at least one anatomical feature comprises at least one of a heart, a heart chamber, a verterbra, a rib, a sternum, a diaphragm, and a secondary coronary artery.

7. The apparatus according to claim 1, wherein the image refinement unit is further configured to perform an initial registration of the first medical image data and the second medical image data, select the region for further registration, and perform a further registration of the first medical image data corresponding to the selected region and the second medical image data.

8. The apparatus according to claim 7, wherein the initial registration comprises a non-rigid registration and the further registration comprises an affine registration.

9. The apparatus according to claim 1, wherein the rendering unit is configured to render the image in accordance with a standard angiography angle.

10. The apparatus according to claim 1, wherein the rendering unit is configured to render the combined image as an inverse maximum intensity projection.

11. The apparatus according to claim 1 wherein the vessel comprises at least one of a coronary artery an aorta, a peripheral vessel in an arm or leg, a carotid vessel, a renal artery, a splenic artery, a hepatic artery, and a blood vessel of the brain.

12. The apparatus according to claim 1, wherein the contrast-enhanced image data is obtained from a contrast-enhanced CT angiography measurement.

13. The apparatus according to claim 1, wherein the first medical image data is obtained from a non-contrast enhanced CT scan acquired for calcium scoring.

14. The apparatus according to claim 1 wherein the first medical image data and the second medical image data comprise at least one of spectral CT data, cone-beam CT data, single energy CT data, and MR data.

15. A method of processing volumetric medical image data in an imaging procedure, the method comprising:
  obtaining first non-contrast-enhanced medical image data representative of a region including at least one vessel and at least one associated feature, and second contrast-enhanced medical image data representative of at least part of the region and setting the region on the first non-contrast-enhanced medical image data and the second contrast-enhanced medical image data, wherein the first non-contrast-enhanced medical image data comprises one of CT data, cone-beam CT data, and MR data, and the second contrast-enhanced medical image data comprises one of CT data, cone-beam CT data, and MR data such that the first non-contrast-enhanced medical image data and the second contrast-enhanced medical image data both comprise CT data or both comprise cone-beam CT data or both comprise MR data, and wherein neither the first non-contrast-enhanced medical image data nor the second contrast-enhanced medical image data comprises data obtained by catheter coronary angiography;
  executing, by processing circuitry, a local registration between the first non-contrast-enhanced medical image data and the second contrast-enhanced medical image data based on the set region and subtracting the second contrast-enhanced medical image data from the first non-contrast-enhanced medical image data to produce a combined image representative of the at least one vessel, wherein the associated feature is removed or reduced in intensity in the combined image; and
  rendering the combined image as a simulated catheter coronary angiogram view without using data obtained by catheter coronary angiography.

16. A non-transitory computer-readable medium storing computer-readable instructions that are executable to perform the method according to claim 15.

* * * * *